(12) United States Patent
Müller et al.

(10) Patent No.: US 6,777,116 B1
(45) Date of Patent: Aug. 17, 2004

(54) DIRECT DIMETHYL ETHER FUEL CELLS

(75) Inventors: Jens Müller, Blaustein (DE); Peter Urban, Ulm (DE); Regina Wezel, Ulm (DE); Kevin M. Colbow, North Vancouver (CA); Jiujun Zhang, Richmond (CA)

(73) Assignee: Ballard Power Systems Inc., Burnaby (CA)

( * ) Notice: Subject to any disclaimer, the term of this patent is extended or adjusted under 35 U.S.C. 154(b) by 0 days.

(21) Appl. No.: 09/256,386

(22) Filed: Feb. 24, 1999

(30) Foreign Application Priority Data

Feb. 25, 1998 (DE) ......................... 198 07 876

(51) Int. Cl.[7] .............................................. H01M 8/04
(52) U.S. Cl. ............................ 429/15; 429/12; 429/13; 429/19
(58) Field of Search ............................ 429/12, 13, 15, 429/19

(56) References Cited

U.S. PATENT DOCUMENTS

| | | | |
|---|---|---|---|
| 2,925,454 A | 2/1960 | Justi et al. | 136/86 |
| 3,227,585 A | 1/1966 | Langford et al. | 136/86 |
| 4,450,055 A | 5/1984 | Stafford | 204/78 |
| 5,723,228 A | 3/1998 | Okamoto | 429/12 |
| 5,747,185 A | 5/1998 | Hsu | 429/44 |
| 5,856,036 A | 1/1999 | Smotkin et al. | 429/40 |
| 6,299,744 B1 * | 10/2001 | Narayanan et al. | 204/263 |
| 6,410,175 B1 * | 6/2002 | Tillmetz et al. | 429/13 |
| 6,444,343 B1 * | 9/2002 | Prakash et al. | 429/33 |

FOREIGN PATENT DOCUMENTS

| | | |
|---|---|---|
| FR | 1436154 | 4/1999 |
| JP | 10-189022 | 7/1998 |
| JP | 10-255830 | 9/1998 |
| JP | 11-144751 | 5/1999 |

OTHER PUBLICATIONS

Zhao, et al., "Electrocatalytic Oxidation of Methanol and Dimethyl Ether on Platinum at Elevated Temperatures in 85% H3P04," Extended Abstracts Fall Meeting, Miami Beach, Florida vol. 94/2, pp. 962–963.

Yasuyuki, et al., "Feasibility if fuel cell using dimethyl ether fuel," Chemical Abstracts, vol. 130, Columbus, Ohio Abstract No. 327226.

Yasuyuki, et al., "Feasibility of Fuel Cell using Dimethyl Ether Fuel", Adv. Alcohol Fuels World, Proc. Int. Symp. Alcohol Fuels, 12th, pp. 403–408 (1998).

* cited by examiner

*Primary Examiner*—Patrick Ryan
*Assistant Examiner*—Dah-Wei Yuan
(74) *Attorney, Agent, or Firm*—McAndrews, Held & Malloy, Ltd.

(57) ABSTRACT

Low temperature fuel cells, e.g. solid polymer fuel cells, can operate directly on a fuel comprising dimethyl ether with dimethyl ether being oxidized at the fuel cell anode. Being highly soluble in water, dimethyl ether can be supplied as a liquid aqueous fuel solution. As a fuel, dimethyl ether provides similar power characteristics as methanol but typically with a greater Faradaic efficiency in liquid feed solid polymer fuel cells.

34 Claims, 10 Drawing Sheets

DIRECT DIMETHYL ETHER FUEL CELLS

FIELD OF THE INVENTION

The present invention relates to fuel cells operating directly on fuel streams comprising dimethyl ether in which dimethyl ether is directly oxidized at the anode. In particular, it relates to solid polymer fuel cells operating directly on liquid fuel streams comprising dimethyl ether. The dimethyl ether may serve as the primary fuel or as a component of a mixed fuel.

BACKGROUND OF THE INVENTION

Solid polymer electrochemical fuel cells convert reactants, namely fuel and oxidants, to generate electric power and reaction products. Electrochemical fuel cells generally employ an electrolyte disposed between two electrodes, namely a cathode and an anode. An electrocatalyst is needed to induce the desired electrochemical reactions at the electrodes. Solid polymer fuel cells operate in a range from about 80° C. to about 200° C. and are particularly preferred for portable and motive applications. Solid polymer fuel cells employ a membrane electrode assembly ("MEA") which comprises a solid polymer electrolyte or ion-exchange membrane disposed between the two electrode layers. Flow field plates for directing the reactants across one surface of each electrode substrate are generally disposed on each side of the MEA. The electrocatalyst used may be a metal black, an alloy or a supported metal catalyst, for example, platinum on carbon. The electrocatalyst is typically incorporated at the electrode/electrolyte interfaces. This can be accomplished, for example, by depositing it on a porous electrically conductive sheet material, or "electrode substrate", or on the membrane electrolyte.

Effective sites on the electrocatalyst are accessible to the reactant, are electrically connected to the fuel cell current collectors, and are ionically connected to the fuel cell electrolyte. Electrons, protons, and possibly other species are typically generated at the anode electrocatalyst. The electrolyte is typically a proton conductor, and protons generated at the anode electrocatalyst migrate through the electrolyte to the cathode.

A measure of electrochemical fuel cell performance is the voltage output from the cell for a given current density. Higher performance is associated with a higher voltage output for a given current density or higher current density for a given voltage output. Another measure of fuel cell performance is the Faradaic efficiency, which is the ratio of the actual output current to the total current associated with the consumption of fuel in the fuel cell. For various reasons, fuel can be consumed in fuel cells without generating an output current, such as when an oxygen bleed is used in the fuel stream (for removing carbon monoxide impurity) or when fuel crosses through a membrane electrolyte and reacts on the cathode instead. A higher Faradaic efficiency thus represents a more efficient use of fuel.

A broad range of reactants have been contemplated for use in electrochemical fuel cells and such reactants may be delivered in gaseous or liquid streams. The oxidant may, for example, be substantially pure oxygen or a dilute oxygen stream such as air. The fuel stream may be substantially pure hydrogen gas, a gaseous hydrogen-containing reformate stream derived from a suitable feedstock, or a suitable gaseous or liquid organic fuel mixture.

The choice of fuel may vary depending on the fuel cell application. Preferably, the fuel is relatively reactive electrochemically, inexpensive, easy to handle, and relatively safe for the environment. Hydrogen gas is a preferred fuel since it is electrochemically reactive and the by-products of the fuel cell reaction are simply heat and water. However, hydrogen can be more difficult to store and handle than other fuels or fuel feedstocks, particularly in non-stationary applications (e.g. portable or motive). For this reason, liquid fuels are preferred in many applications. Fuel cell systems employing liquid fuels generally incorporate a reformer to generate hydrogen as required from a liquid feedstock that is easier to store and handle, e.g. methanol. However, the use of a reformer complicates the construction of the system and results in a substantial loss in system efficiency. To avoid using a separate reformer, fuels other than hydrogen may instead be used directly in fuel cells (i.e. supplied unreformed to the fuel cell anodes). Inside the fuel cell, a fuel mixture may be reacted electrochemically (directly oxidized) to generate electricity or instead it may first be reformed in-situ (internally reformed), as in certain high temperature fuel cells (e.g. solid oxide fuel cells). After being internally reformed, the fuel is then electrochemically converted to generate electricity. While such fuel cell systems may employ fuels that are easier to handle than hydrogen, without the need for a separate reformer subsystem, generally hydrogen offers fundamental advantages with regards to performance and the environment. Thus, improvements in these areas are desirable in order for internally reforming and direct oxidation fuel cell systems to compete more favorably to hydrogen-based systems.

A direct methanol fuel cell (DMFC) is a type of direct oxidation fuel cell that has received much attention recently. A DMFC is generally a liquid feed solid polymer fuel cell that operates directly on an aqueous methanol fuel mixture. There is often a problem in DMFCs with substantial crossover of methanol fuel from the anode to the cathode side through the membrane electrolyte. The methanol that crosses over then reacts with oxidant at the cathode and cannot be recovered, resulting in significant fuel inefficiency and deterioration in fuel cell performance. To reduce crossover, very dilute solutions of methanol (e.g. about 5% methanol in water) are typically used as fuel streams in DMFCs. Unfortunately, such dilute solutions afford only minimal protection against freezing during system shutdown in cold weather conditions, typically down to about −5° C.

In PCT/International Publication No. WO 96/12317 (Application No. PCT/US94/11911), alternative liquid fuels, including dimethoxymethane (DMM), trimethoxymethane (TMM), and trioxane, are suggested for direct use in liquid feed solid polymer fuel cells. Like methanol, these fuels can be oxidized at the fuel cell anode to form carbon dioxide and water at a rate that provides satisfactory fuel cell performance. Methanol appears to be an intermediate product of the oxidation for each of these fuels.

Dimethyl ether (DME) is available in quantity and has been considered as a cleaner alternative fuel for diesel combustion engines. DME is a gas at room temperature and pressure, but it will liquefy at about 5 bar. DME is also highly soluble in water. Aqueous solutions somewhat greater than 1.5 M DME can be prepared at ambient temperature and pressure. DME can be synthesized from natural gas with greater efficiency than methanol and thus it may be preferred over methanol as a fuel or fuel feedstock. DME can be made from methanol via an essentially irreversible reaction, whereas methanol is typically made via a reversible reaction step. Consequently, a higher yield of DME can be produced than methanol. Further, DME is relatively safe, especially compared to other common ethers.

DME has been used as a feedstock in producing reformate streams for use as fuel streams in fuel cell systems by external reforming. For instance, R. A. J. Dams et al. discuss the possibility of using reformed DME for solid polymer fuel cells in "The processing of alcohols, hydrocarbons and ethers to produce hydrogen for a PEMFC for transportation applications", Proc. Inter. Soc. Energy Convers. Eng. Conf. (1997), 32nd, p 837–842, Society of Automotive Engineers. Various apparatus and methods for reforming DME have been disclosed in the art, for example, in published European Patent No. 0754649 and PCT/International Publication No. WO 96/18573 (Application No. PCT/US95/15628). Furthermore, DME has been used as a fuel stream in solid oxide fuel cells, which typically operate circa 1000° C. In this case, the DME is internally reformed in the fuel cell to produce molecular hydrogen and carbon oxides with the hydrogen, in turn, being oxidized at the anode.

SUMMARY OF THE INVENTION

Under certain conditions, it has been discovered that surprisingly good performance can be obtained from a fuel cell operating directly on dimethyl ether wherein dimethyl ether is directly oxidized to generate protons at the anode electrocatalyst. The operating temperature of the fuel cell is lower than that for internally reforming dimethyl ether to form molecular hydrogen. For instance, solid polymer fuel cells typically operate at temperatures less than about 200° C., which is generally too low to internally reform dimethyl ether. Yet, direct dimethyl ether solid polymer fuel cells can exhibit satisfactory performance, particularly when compared to methanol performance in liquid feed solid polymer fuel cells. Thus, dimethyl ether is suitable for use as the primary fuel in a direct fuel cell system. Alternatively, since dimethyl ether has a desirably low freezing point, it may be used as a reactive antifreeze additive in the fuel supply of a liquid feed fuel cell, such as that of a direct methanol fuel cell.

In a direct dimethyl ether fuel cell, a fuel stream comprising dimethyl ether is supplied directly to the fuel cell anode for direct oxidation therein. Thus, a direct dimethyl ether fuel cell system comprises a system for supplying a dimethyl ether fuel stream to the anode. The fuel stream may contain other reactants and may desirably be supplied as a liquid. For instance, water is a reactant and the fuel stream may be an aqueous solution of dimethyl ether. Where the dimethyl ether is used as a primary fuel, concentrated solutions (about 1.5 moles of dimethyl ether per liter of water and up) may be employed. Or, the dimethyl ether may be used in combination with one or more additional fuels. For instance, the liquid fuel stream may comprise greater than about 0.1 mole of dimethyl ether per liter of water. The fuel stream may also optionally contain an acid.

The rate of reaction of dimethyl ether at the fuel cell anode may be significantly improved by employing higher fuel supply pressures. For instance, it can be advantageous to supply a liquid fuel stream to the anode at a pressure greater than about 4 bar absolute. The anode of the fuel cell may comprise a platinum ruthenium alloy electrocatalyst.

On the oxidant side, the performance of a direct dimethyl ether fuel cell may be satisfactory at a relatively low oxidant pressure, e.g. less than about 3 bar absolute. Further, the performance may be satisfactory at a relatively low oxidant stoichiometry, e.g. less than about 1.6. (Herein, stoichiometry is defined as the ratio of reactant supplied to that of reactant consumed.) The use of lower oxidant stoichiometries and/or pressures can be advantageous since supply of a compressed oxidant stream can represent a substantial parasitic load in a fuel cell system. Also, the startup of fuel cell systems from shutdown may often be delayed until compressors can supply an adequate supply of compressed air. Being able to operate at lower oxidant pressures can therefore accelerate the startup of such systems.

Particularly at low current densities, a direct dimethyl ether fuel cell may show efficiency advantages over other fuel cell types. For instance, an efficiency advantage may be obtained over direct methanol fuel cells particularly at current densities less than about 300 mA/cm$^2$. Efficiencies are generally improved by recirculating unreacted dimethyl ether back into the fuel stream. Unreacted dimethyl ether is generally present in the anode exhaust, and it may also be present in the cathode exhaust as a result of crossover through the electrolyte. However, unlike certain other fuels like methanol, dimethyl ether does not typically react at the cathode electrocatalyst. Thus, any dimethyl ether fuel that crosses over to the cathode side is not consumed and need not be irreversibly lost. In principle therefore, unreacted dimethyl ether may be recirculated into the inlet fuel stream from both the cathode and anode exhausts.

A preferred system for directly supplying dimethyl ether in a fuel cell system may additionally comprise a mixing apparatus for providing the fuel stream for the fuel cell. Mixing apparatus inlets may then be fluidly connected to supplies of dimethyl ether and water reactant, while a mixing apparatus outlet may be fluidly connected to the anode of the fuel cell. If an additional fuel, such as methanol, is desired in the fuel stream, a supply of the additional fuel may also be fluidly connected to a mixing apparatus inlet. For various reasons, e.g. obtaining higher operating efficiencies under varying loads, it may be desirable to vary the composition of the fuel stream supplied to the anode during the operation of the fuel cell. In such a case, the mixing apparatus would desirably modify the composition in accordance with a suitable operating parameter of the fuel cell. To recirculate dimethyl ether from an electrode exhaust, a recirculation loop can be employed that fluidly connects the electrode exhaust to another mixing apparatus inlet. A heat exchanger may be employed in the recirculation loop to cool the fuel stream discharged from the electrode.

Having dimethyl ether in the fuel supply provides protection against freezing of a fuel cell system in general. However, introducing dimethyl ether into the cathode before shutdown is also beneficial in that freezing of water in the cathode during shutdown is prevented.

DETAILED DESCRIPTION OF THE PREFERRED EMBODIMENTS

A preferred fuel cell system comprises a stack of solid polymer fuel cells operating directly on dimethyl ether (DME). DME reacts directly with water at the fuel cell anodes to generate protons, electrons, and carbon dioxide. At the cathodes, the protons and electrons combine with oxygen to generate water. The fuel stream supplied to the anode thus comprises a suitable mixture of DME and water. For volume efficiency, particularly for non-stationary applications, the fuel stream and/or its constituents are preferably stored in liquid form.

Figure 1:
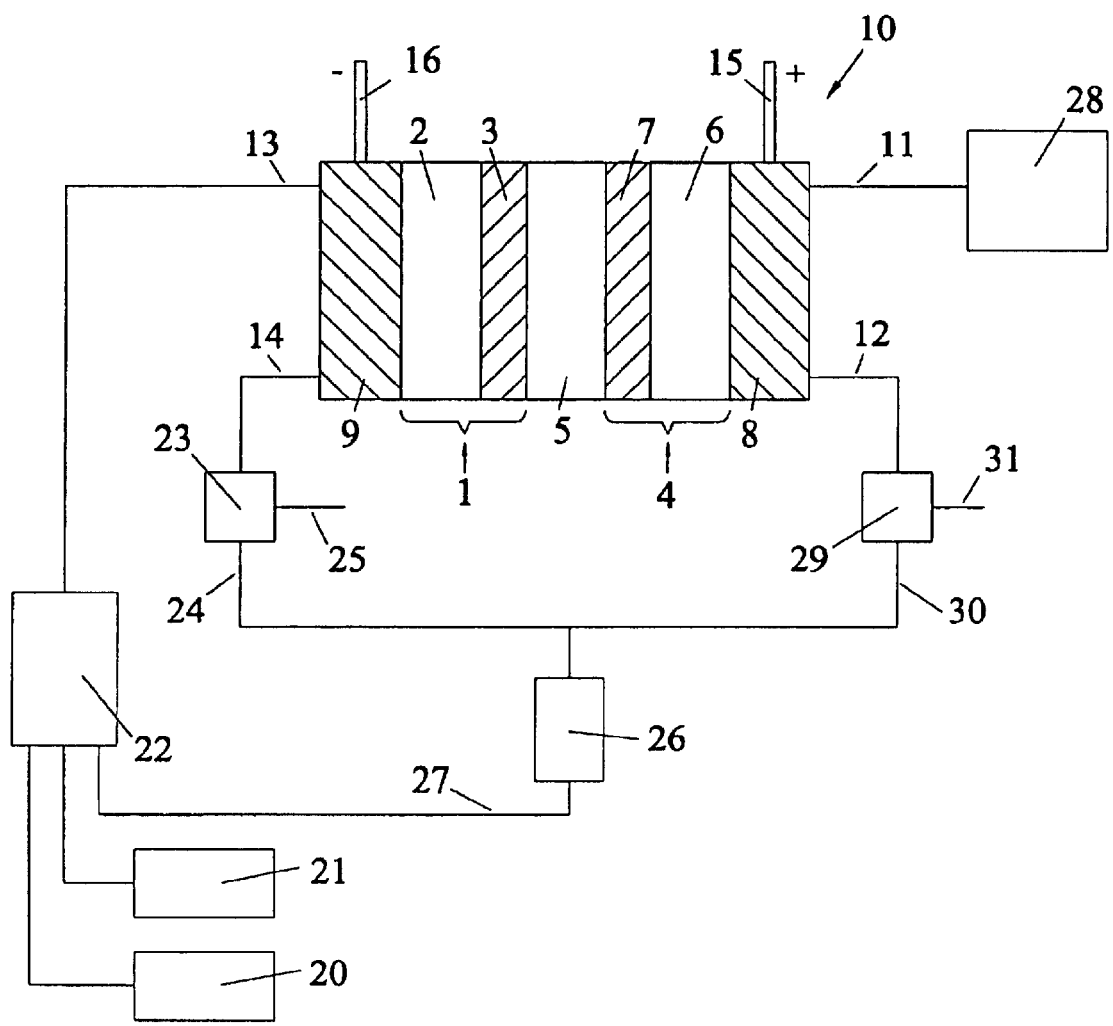
FIG. 1 shows a schematic diagram of a direct dimethyl ether solid polymer fuel cell system.

FIG. 1 shows a schematic diagram of a direct dimethyl ether solid polymer fuel cell system operating on a liquid fuel feed and employing exhaust recirculation. For purposes of illustration, the stack is represented merely by a single liquid feed fuel cell 10 in FIG. 1. Fuel cell 10 contains a membrane electrode assembly (MEA) comprising a porous cathode 4 and porous anode 1 that are bonded to a solid polymer membrane electrolyte 5. The porous anode 1 typically comprises a carbonaceous substrate 2 and electrocatalyst layer 3. Proton conducting ionomer is preferably dispersed throughout the electrocatalyst layer 3 and optionally, the substrate 2. In a like manner, porous cathode 4 typically comprises a carbonaceous substrate 6 and electrocatalyst layer 7 with ionomer similarly dispersed throughout. Oxidant flow field 8 and liquid fuel flow field 9 are pressed against cathode substrate 6 and anode substrate 2 respectively on the faces opposite the membrane electrolyte 5. Fuel cell 10 has an oxidant inlet 11, an oxidant outlet 12, a liquid fuel stream inlet 13, and a liquid fuel stream outlet 14. Electrical power is obtained from the fuel cell via positive and negative terminals 15 and 16 respectively.

As shown in FIG. 1, the fuel stream is a DME/water mixture derived from a DME/water supply 20, a liquefied DME supply 21, and a recirculated DME/water mixture from line 27. The DME/water supply 20 is provided at a desired concentration for fuel cell operation. The arrangement shown here may be preferred if the recirculated DME/water mixture generally contains a lower concentration of DME than is desired in the fuel stream. In such a case, the desired concentration can be prepared by suitably augmenting the mixture with DME via line 27 from DME supply 21. An advantage of this arrangement is that each of the DME/water supply 20, liquefied DME supply 21, and line 27 may comprise sufficient DME in their respective fluids to provide protection against freezing in low temperature conditions. Other arrangements may be preferable however depending on the specifics of system construction and operation.

Fluids from each of the DME/water supply 20, liquefied DME supply 21, and line 27 are then supplied to inlets of mixing apparatus 22 in which the fluids are combined to form an appropriate fuel stream. Under certain circumstances, it may be desirable to be able to vary the composition of the fuel stream. For instance, if methanol/DME/water fuel streams are employed, it might be desired to increase the DME concentration during low fuel cell loads in order to obtain higher efficiency. Consequently, it may be desirable to control the composition of the fuel stream provided by mixing apparatus 22 in accordance with certain system parameters (e.g., stack voltage). Suitable concentration sensors may desirably be employed in order to monitor and control the fuel stream composition.

Preferably, the fuel stream contains a high concentration of fuel in order to obtain higher rates of reaction and to reduce the amount of water circulating through the anode. The solubility of DME in water is relatively high, about 1.6 moles/liter at standard temperature and pressure. DME solutions in this concentration range can be employed in direct DME fuel cells. Further, it has been found that higher fuel stream pressures can result in significantly higher rates of reaction in certain direct DME fuel cells. Thus, higher fuel stream pressures may be preferred (e.g. $\geq 4$ bars absolute).

The fuel stream in FIG. 1 flows through fuel flow field 9 and the excess is then discharged to separator 23 where carbon dioxide reaction product may be separated from unreacted DME and water in the fuel stream exhaust. Carbon dioxide may then be vented via line 25 while the unreacted DME/water mixture may be recirculated via line 27. A heat exchanger 26 may be employed to cool some or all of the recirculating fluid stream.

The oxidant stream in FIG. 1 is provided by a compressed air supply 28 and flows through oxidant flow field 8. The use of dimethyl ether can allow low oxidant stoichiometries to be used (e.g. less than 1.6) without adversely affecting fuel cell performance. Consequently, less compressed air is required, thereby reducing parasitic power losses associated with use of a compressor.

Under the above fuel stream conditions, and depending on the membrane 5, DME may cross over to the cathode in otherwise conventional solid polymer fuel cell constructions. Advantageously though, conditions at the cathode are not the same as those at the anode and the reaction of DME at the cathode is generally negligible with conventional cathode electrocatalysts. This unreacted DMB is desirably recovered as well and thus a recirculation loop from the cathode exhaust may also be employed as shown in FIG. 1. Separator 29 may be used to separate oxygen and any carbon dioxide from DME and water in the cathode exhaust. The former may be vented out line 31 while the latter may be recirculated via line 30. Separator 29 may for example employ pressure swing absorption, water absorption, or membrane separation methods to accomplish such separation.

While DME crossover may be significant in conventional solid polymer fuel cell constructions, it is expected that the extent of crossover might be reduced with suitable improvements to membranes or anode electrocatalysts. More selective membranes may pass protons but negligible DME. Or, improved anode electrocatalysts may provide satisfactory reaction rates, but at lower fuel pressures, thereby reducing crossover.

DME is used as the primary fuel in the system shown in FIG. 1. However, DME offers potential benefits as an antifreeze fuel or fuel additive by protecting against freezing at the anode side of the fuel cell system during storage. Further, some DME diffuses into and through the proton exchange membrane electrolyte, thus helping to prevent freezing of the membrane electrolyte. To prevent freezing at the cathode side, it may be desirable to flush a fluid comprising dimethyl ether through the cathode to sweep out remaining water and substitute DME solution.

The electrochemical reactions that take place in a direct DME solid polymer fuel cell are not completely understood.

However, without being bound by theory, the following proposed reactions and discussion appear to match the observations to date.

At the cathode side: $12H^+ + 12e^- + 3O_2 \rightarrow 6H_2O$

At the anode side: $CH_3-O-CH_3 + 3H_2O \rightarrow 12H^+ + 12e^- + 2CO_2$

DME may be first adsorbed on the anode electrocatalyst surface at elevated potential. The adsorbed fragment may be attacked by a water molecule, leaving an adsorbed methanol fragment on the electrocatalyst and releasing a molecule of methanol. Both the fragment and the released methanol may then either be oxidized as in a conventional direct methanol fuel cell (according to the reaction $CH_3OH + H_2O \rightarrow 6H^+ + 6e^- + CO_2$) or, in the case of the latter, may cross over through the membrane. Any methanol that crosses over generally reacts readily at the cathode and thus typically negligible methanol is noticed in the cathode exhaust. Carbon dioxide appears in the cathode exhaust however, as a product of the methanol crossover reaction and also from crossover of carbon dioxide produced at the anode.

Some DME may also cross over to the cathode side but typically does not react. There are several reasons why, with conventional cathode electrocatalysts, DME may react at reasonable rates at the anode but not at the cathode including: a low concentration of DME and a high concentration of oxygen at the cathode (which may make it difficult for DME to compete with oxygen for adsorption onto the electrocatalyst), a low water concentration (which is needed in the reaction), and a low pressure (see the effect of pressure vs. performance in the following Examples). In certain embodiments at least, virtually no DME seems to react on the cathode side. As a result, it can be recovered in principle thereby improving fuel efficiency.

The following examples have been included to illustrate different embodiments and aspects of the invention but these should not be construed as limiting in any way;

Electrochemical Cell Examples

Figure 2A:
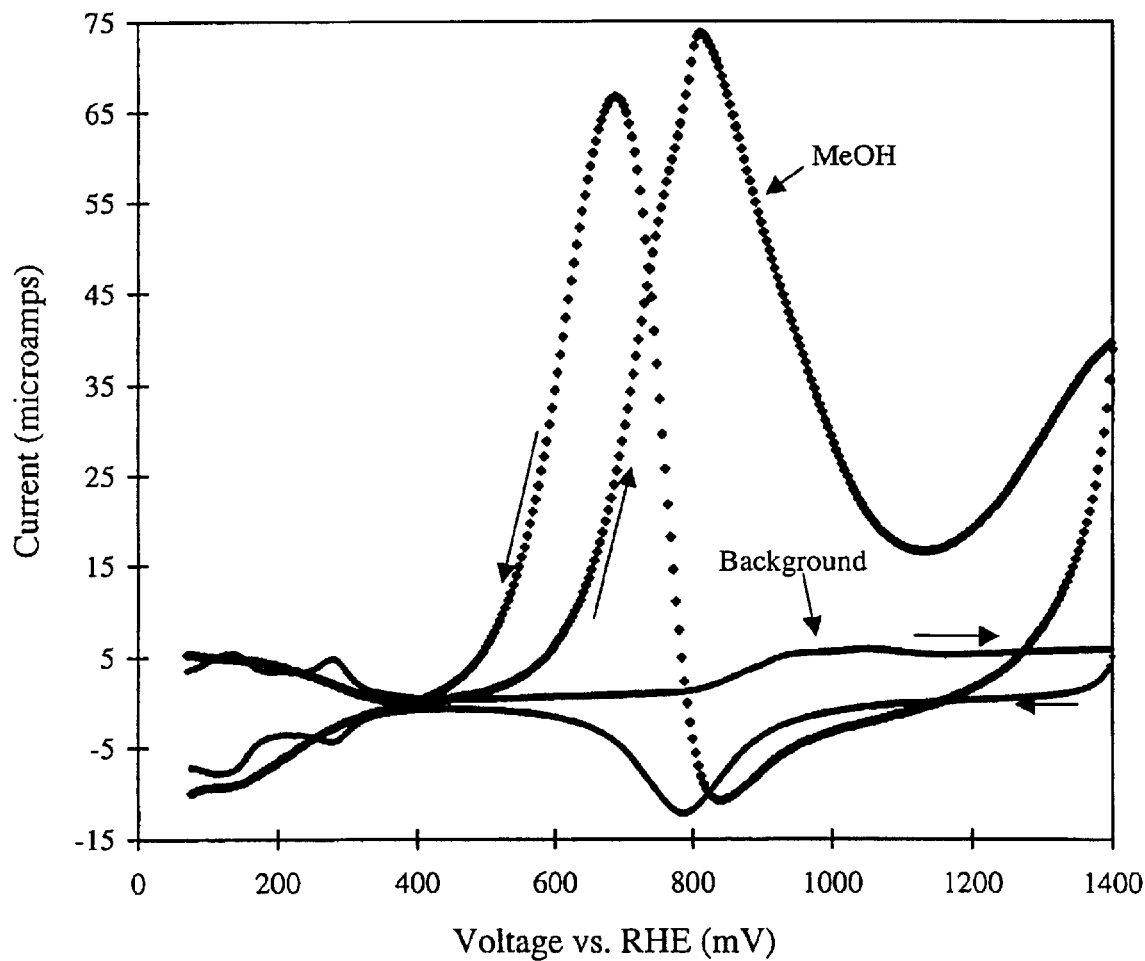
FIGS. 2a and 2b show cyclic voltammetry curves for aqueous solutions of methanol and dimethyl ether respectively in a voltage range of interest for fuel cell operation.
Figure 2B:
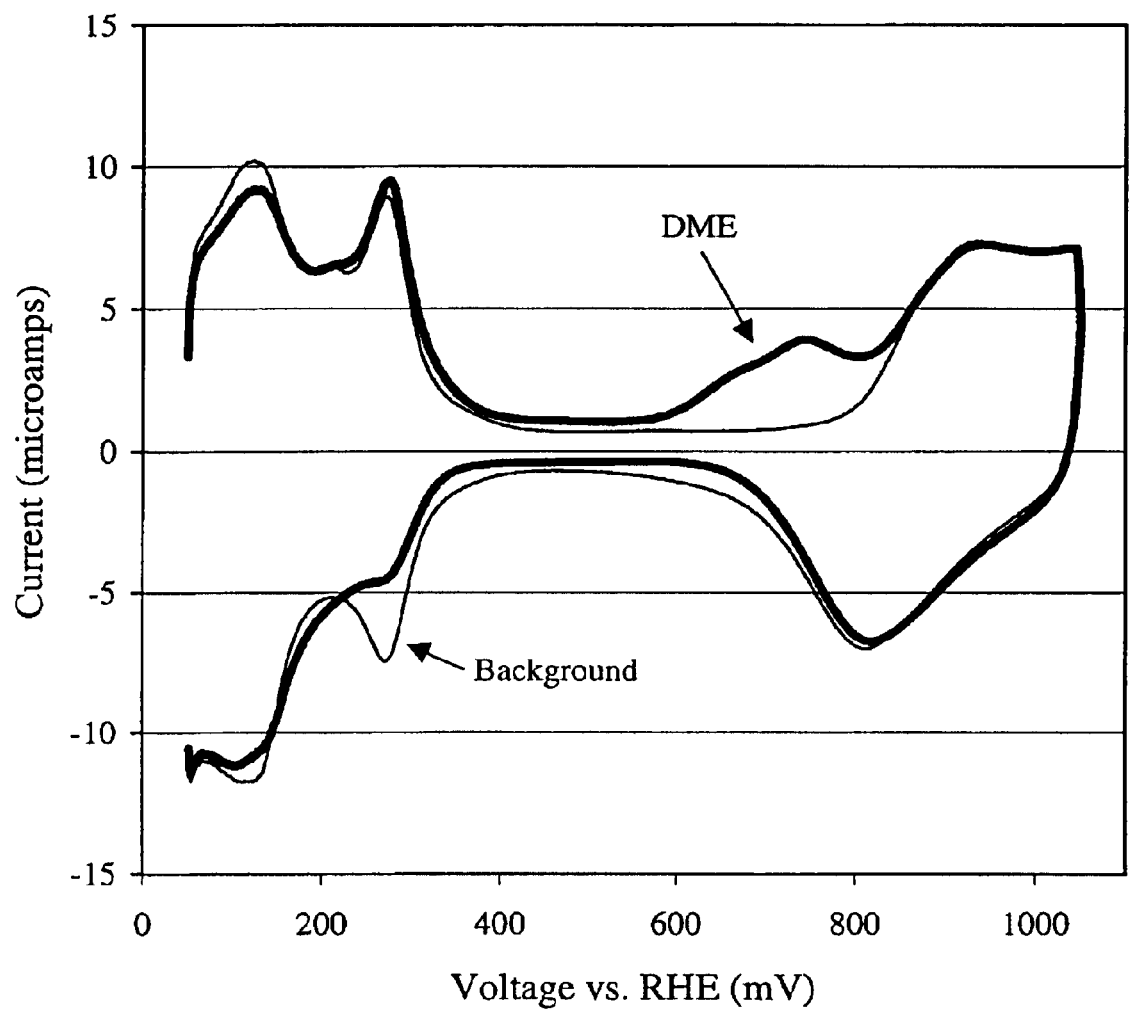

Cyclic voltammetry curves were obtained for aqueous fuel solutions of methanol and dimethyl ether in a voltage range of interest for fuel cell operation. Measurements were made in a test cell containing 0.1M sulfuric acid at 25° C. at ambient pressure using platinum working, counter, and reference electrodes. The aqueous fuel solutions were added to the acid electrolyte while the cell potential was controlled at 50 mV versus RHE (reversible hydrogen electrode). Then the voltage was swept at 50 mV/s. FIG. 2a shows the results (current as a function of voltage versus RHE) for 0.01M methanol (MeOH) in water. FIG. 2b shows the results for 0.1M DME in water. Background sweeps are also shown in each Figure. While the methanol solution shows substantial activity during the sweep, little activity is seen for the DME solution.

The hydrogen peaks in FIG. 2b are practically not affected by the addition of DME (compare the background and DME sweeps below 200 mV). This suggests that there is no significant coverage of the working electrode with organic species, implying that DIME adsorption does not take place. Once the potential exceeded about 300 mV, the hydrogen peaks appear somewhat suppressed on a reverse sweep or on subsequent sweeps, suggesting that some DME fragment did get adsorbed. After several sweeps (not shown), the cyclic voltammetry results qualitatively appear similar to that for the addition of methanol. Without elevating the potential, there is no significant suppression of the hydrogen peaks with added DME, even after 15 minutes or elevated temperatures. Thus, it appears that there is no conversion of DME to methanol or any other species at low potentials.

Under the above conditions, methanol would appear to be a suitable fuel for a direct fuel cell but, based on cyclic voltammetry, DME does not seem sufficiently active.

Figure 2C:
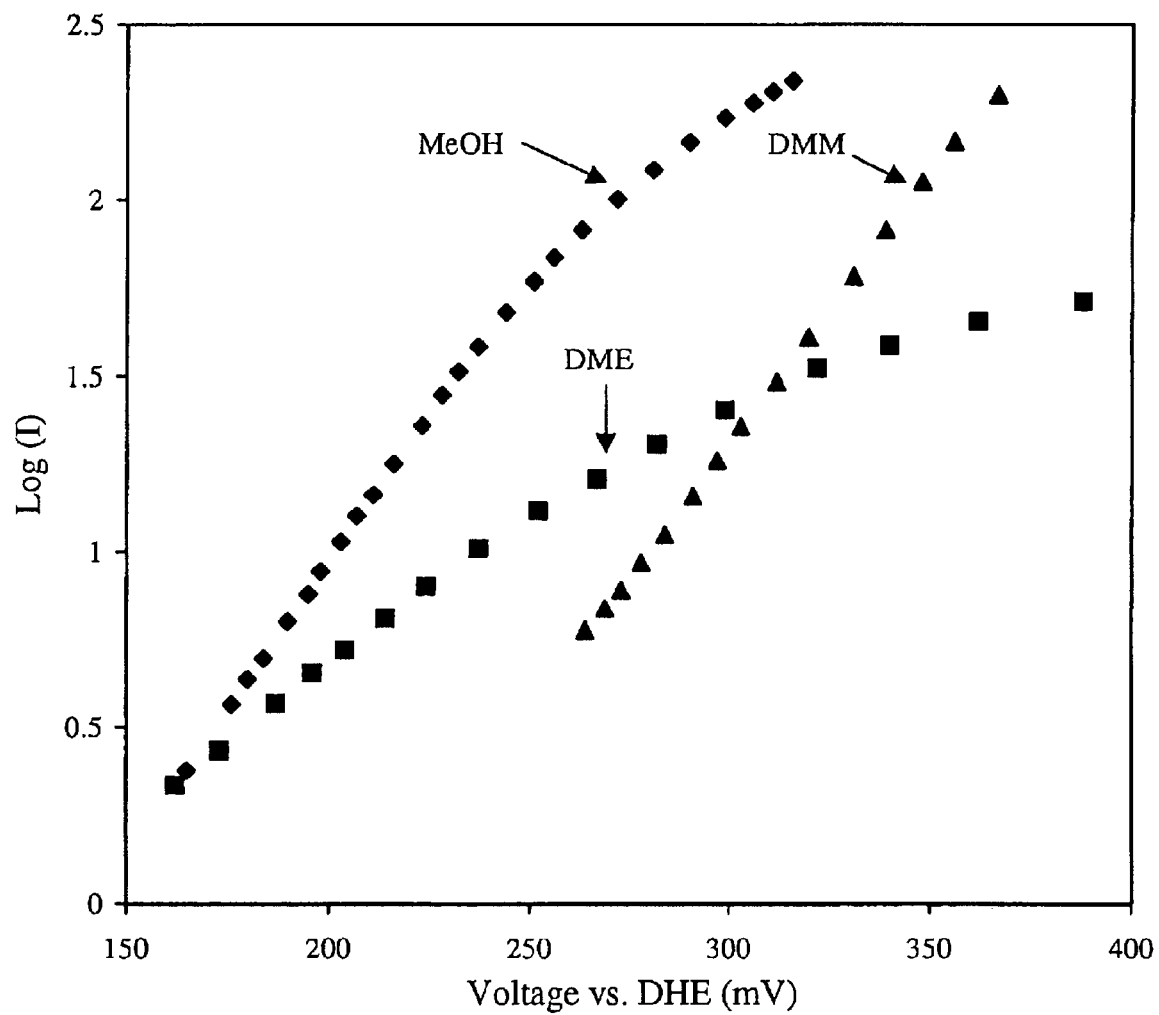
FIG. 2c shows Tafel plots for the oxidation of aqueous solutions of methanol, dimethyl ether, and dimethoxymethane.

In FIG. 2c, Tafel plots were obtained for the oxidation of certain aqueous solutions of methanol (MeOH), DME, and dimethoxymethane (DMM) at 94° C. The measurement cell employed a platinum/ruthenium anode supplied with 0.7M aqueous fuel solutions at a pressure of 3 bar absolute. The cell also employed a cathode supplied with hydrogen that served as a Dynamic Hydrogen Electrode (DHE).

The Tafel slopes for the DMM and methanol solutions in FIG. 2c are similar, suggesting a similar reaction mechanism. For example, the DMM is completely converted to methanol in the cell and then reacts like methanol thereafter. However, the slope for the DME solution is substantially less than the others, suggesting a different reaction mechanism and further suggesting that DME is not as reactive as either of the other fuels.

Fuel Cell Examples Using DME Fuel

Solid polymer fuel cells were constructed and tested under varying conditions using DME/water mixtures as the supplied fuel stream. Methanol/water fuel streams were also used for comparative purposes. Unless otherwise indicated in the following, the anodes and cathodes comprised unsupported platinum/ruthenium and platinum catalysts respectively at about 4 mg/cm² loadings on TGP grade (product from Toray) carbon fiber paper substrates. The active electrode area was about 49 cm². The membrane electrolyte employed was Nafion™ 117. Compressed air was used as the oxidant stream at 3 bar absolute pressure and the supplied fuel stream was 1.5M aqueous DME at a 5 bar absolute pressure (approximately the vapor pressure of DME at room temperature). Fluid flow rates were such that, at current densities of 300 mA/cm², the oxidant stoichiometry was 2, and the fuel stoichiometries were approximately 25 and 2 for DME and methanol fuel streams respectively.

Figure 3:
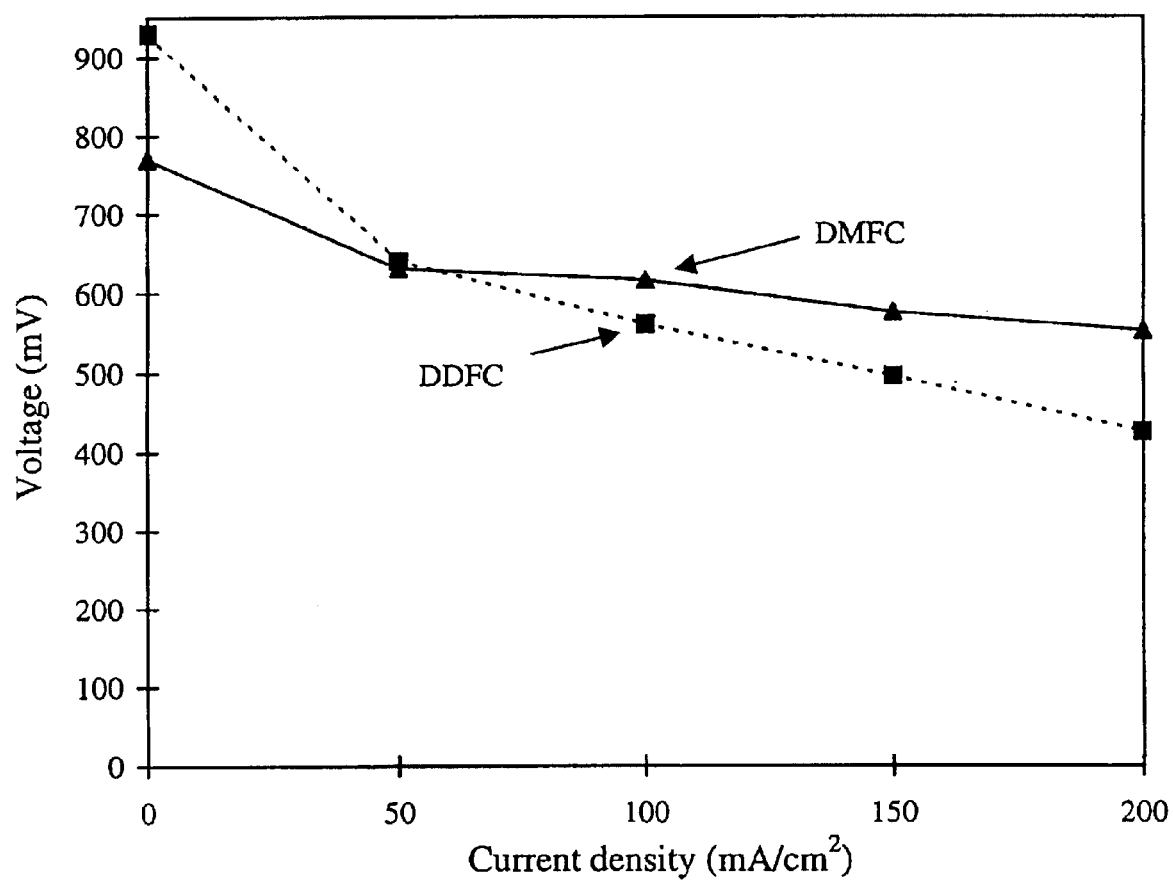
FIG. 3 compares the polarization curves of a direct dimethyl ether fuel cell to that of a direct methanol fuel cell.

The polarization curves (i.e. voltage as a function of current density) for a direct methanol and a direct DME fuel cell were determined at approximately 125° C. and are shown in FIG. 3 (denoted DMFC and DDFC respectively). The performance of the direct DME fuel cell (DDFC) compared favorably to that of the direct methanol fuel cell (DMFC). At low current density, the operating voltage of the direct DME fuel cell was higher than that of the direct methanol fuel cell.

The voltage, Faradaic, and total efficiencies (denoted $\eta_V$, $\eta_F$, and $\eta_{TOT}$ respectively) were determined for a direct DME (DDFC) and a direct methanol (DMFC) fuel cell at approximately 115° C. The various efficiencies for each cell are compared in FIG. 4 over a range of current densities. Here, the voltage efficiency is given by the operating voltage divided by an equilibrium potential associated with the overall reaction in the fuel cell. For the DME reaction, the equilibrium potential used to determine the voltage efficiency was 1.129V (the equilibrium potential at approximately 110° C. and lower heating value). For the methanol reaction, the equilibrium potential used to determine the voltage efficiency was 1.057V (the equilibrium potential at approximately 110° C. and lower heating value).

The Faradaic efficiency is indicative of how much electricity is obtained from the reaction of fuel in the fuel cell. Thus, Faradaic efficiency is lowered, for instance, when fuel crosses over and reacts at the cathode without generating useable electricity. However, Faradaic efficiency is unaffected when fuel passes through the fuel cell without reacting. This unreacted fuel can be recovered and reused in principle. (Of course, a loss occurs in practice if any unreacted fuel is not recovered.)

Here, Faradaic efficiency is given by the amount of fuel consumed in generating electricity divided by the amount of fuel consumed in generating electricity plus that consumed by reaction at the cathode as a result of crossover. The amount of fuel consumed in generating electricity is simply determined from the electrical output of the fuel cell. To determine the amount of fuel that reacts at the cathode, it was assumed that only methanol (a proposed intermediate in the reaction of DME at the anode that may then cross over to the cathode) reacts at the cathode, thereby generating carbon dioxide. DME was assumed not to react. Then, the total amount of carbon dioxide in the cathode exhaust was quantified by gas chromatography. After correcting this total amount for the contribution originating from crossover of carbon dioxide product from the anode, the remaining carbon dioxide amount then represents that which is generated from crossover methanol. The amount of carbon dioxide which crosses over from the anode was determined by applying a load to the fuel cell while flowing nitrogen over the cathode. In this way, conditions at the anode during actual operation could be duplicated using the load. However, since the cathode is inactive (no oxygen present), the amount of carbon dioxide in the nitrogen exhaust now originates solely from crossover. (A satisfactory cross-check of these values was also obtained using an alternative method based on quantifying the amount of oxygen in the cathode exhaust. The total amount of oxygen consumed represents that consumed in the generation of electricity plus that consumed in reacting with crossover methanol.)

Finally, the total efficiency is given by the product of the voltage and the Faradaic efficiencies.

Figure 4:
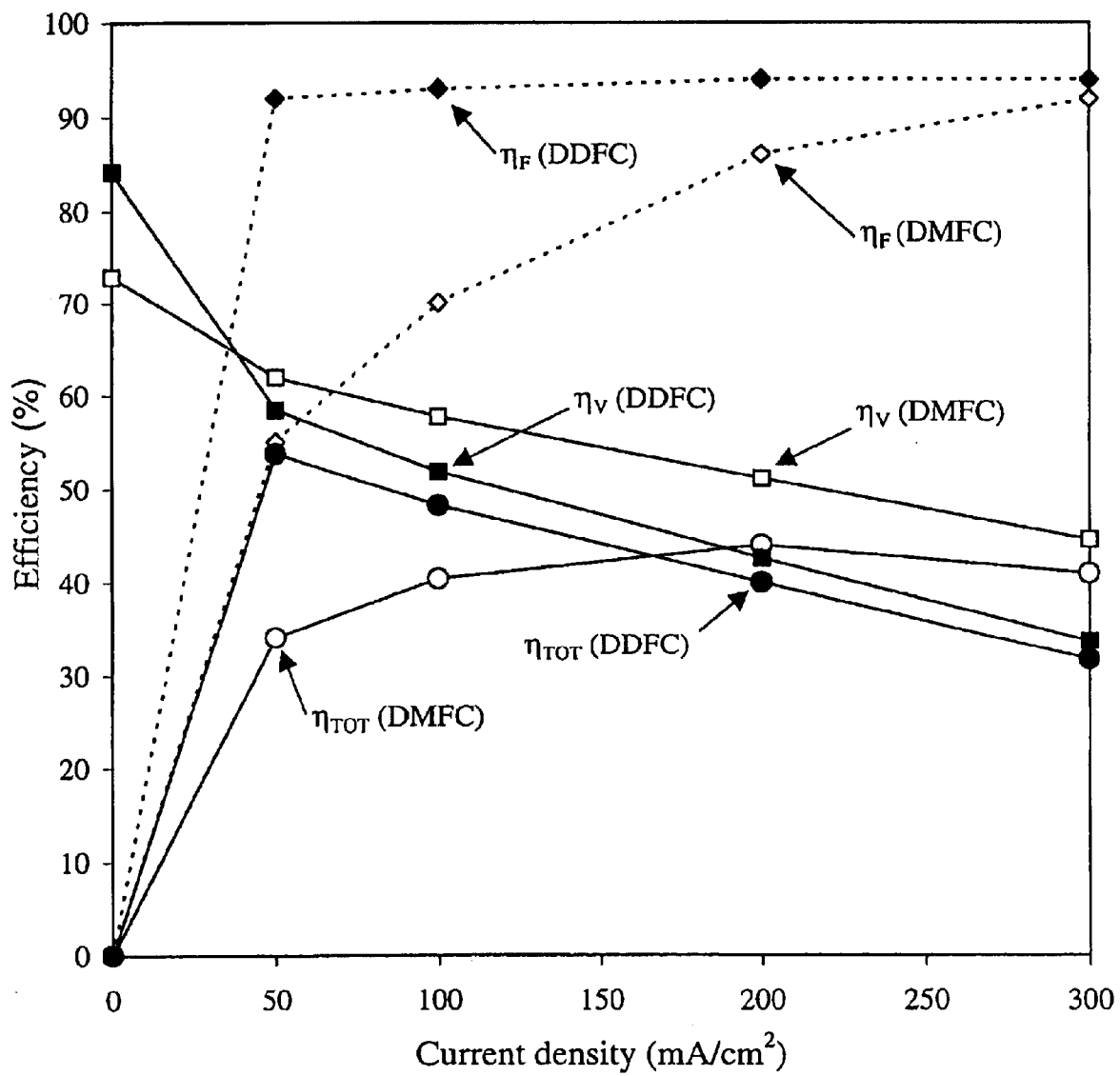
FIG. 4 compares various efficiencies of a direct dimethyl ether fuel cell to that of a direct methanol fuel cell.
Figure 5:
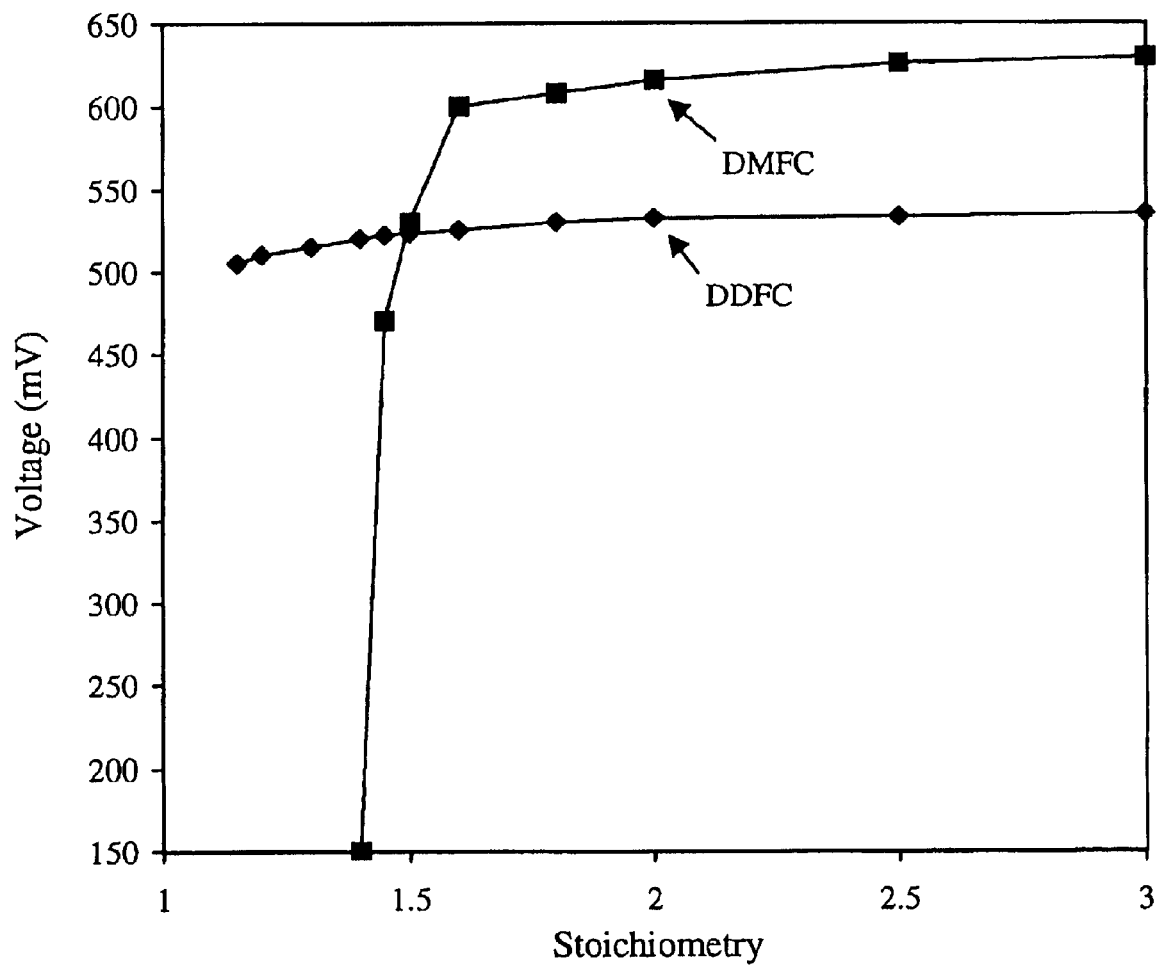
FIG. 5 compares the performance of a direct dimethyl ether fuel cell to that of a direct methanol fuel cell as a function of oxidant stoichiometry.

As shown in FIG. 4, the efficiencies of a direct DME fuel cell compare favorably with those of a direct methanol fuel cell, particularly at lower current densities. The performance of a direct dimethyl ether fuel cell (DDFC) as a function of oxidant stoichiometry was compared to that of a direct methanol fuel cell (DMFC), both operating on air as the oxidant stream. FIG. 5 compares the values obtained at a constant current density of 100 mA/cm$^2$ at approximately 125° C. Below an oxidant stoichiometry of about 1.6, the direct methanol fuel cell performance drops off sharply. However, the direct DME fuel cell performance remains relatively constant even to oxidant stoichiometries below 1.2.

Figure 6:
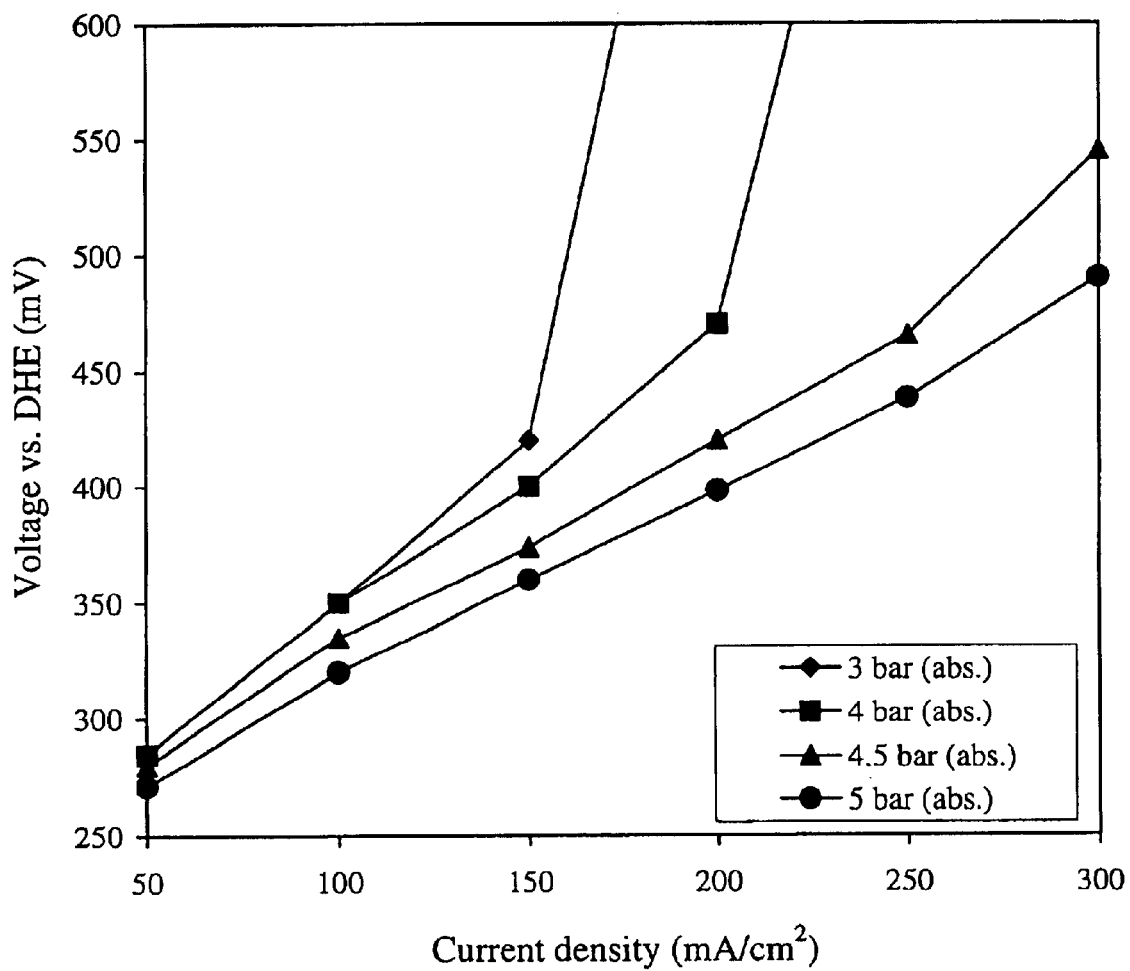
FIG. 6 shows the effect of fuel stream pressure on the anode polarization curves for a direct dimethyl ether fuel cell.

The effect of fuel stream pressure on the anode polarization curves was determined in a direct DME fuel cell operating at approximately 115° C. on a 1.37M aqueous DME fuel stream. FIG. 6 shows the voltage versus a dynamic hydrogen electrode (DHE) as a function of current density for several fuel stream pressures. Here, the pressure effect on the anode has been isolated from any cathode effects by flowing hydrogen at a pressure of 3 bar absolute over the cathode, thereby using the cathode as a dynamic hydrogen electrode (DHE). Thus, only anode over potentials were measured for FIG. 6. To prevent Ru in the anode electrocatalyst from dissolving, the voltage was kept below 800 mV. As shown in FIG. 6, pressure has a significant effect on the polarization curves. No such pressure effect was seen using methanol fuel (not shown).

The amount of DME crossover during operation of a direct DME fuel cell was determined by gas chromatography of the cathode exhaust. The fuel stream used in this cell was pressurized 1.8M aqueous DME. Air was directed to the cathode at 485 standard ml/minute (corresponding to an oxidant stoichiometry of approximately 2 at 300 mA/cm$^2$) at 4.5 bar pressure absolute. The DME concentration in the exhaust at several operating current densities at approximately 120° C. appear in the following Table.

| Current density (mA/cm$^2$) | 0 | 50 | 100 | 150 | 200 |
|---|---|---|---|---|---|
| DME concentration (vol. %) | 2.00 | 1.62 | 1.34 | 1.18 | 1.03 |

The concentration of $CO_2$ in the cathode exhaust was also measured to be 0.60% at 100 mA/cm$^2$. Of this, 0.29% was attributed to $CO_2$ crossover from the anode and 0.31% was attributed to reaction product from cross over of methanol (an intermediate oxidation product determined as per the procedure for determining Faradaic efficiency above). Further, the DME concentration in the cathode exhaust was determined while flowing nitrogen over the cathode. No significant change in the DME concentration was observed when the cathode was switched from operation on oxygen to operation on nitrogen, thereby confirming the assumption that DME does not react at the cathode.

Fuel Cell Examples Using Methanol/DME Fuel

Solid polymer fuel cells were also constructed and tested using methanol/DME/water mixtures as the supplied fuel stream. Again, methanol/water fuel streams were used for comparative purposes. These fuel cells were constructed and operated as in the previous Example except that conditions were closer to those of conventional direct methanol fuel cells. In particular, a lower fuel stream pressure, 1 bar absolute, was employed (a typical operating pressure for a direct methanol fuel cell but not a preferred pressure for a direct DME fuel cell as indicated by FIG. 6). Additionally, the fuel cells used different thicknesses of carbon fiber paper substrate and were operated at approximately 95° C.

Figure 7A:
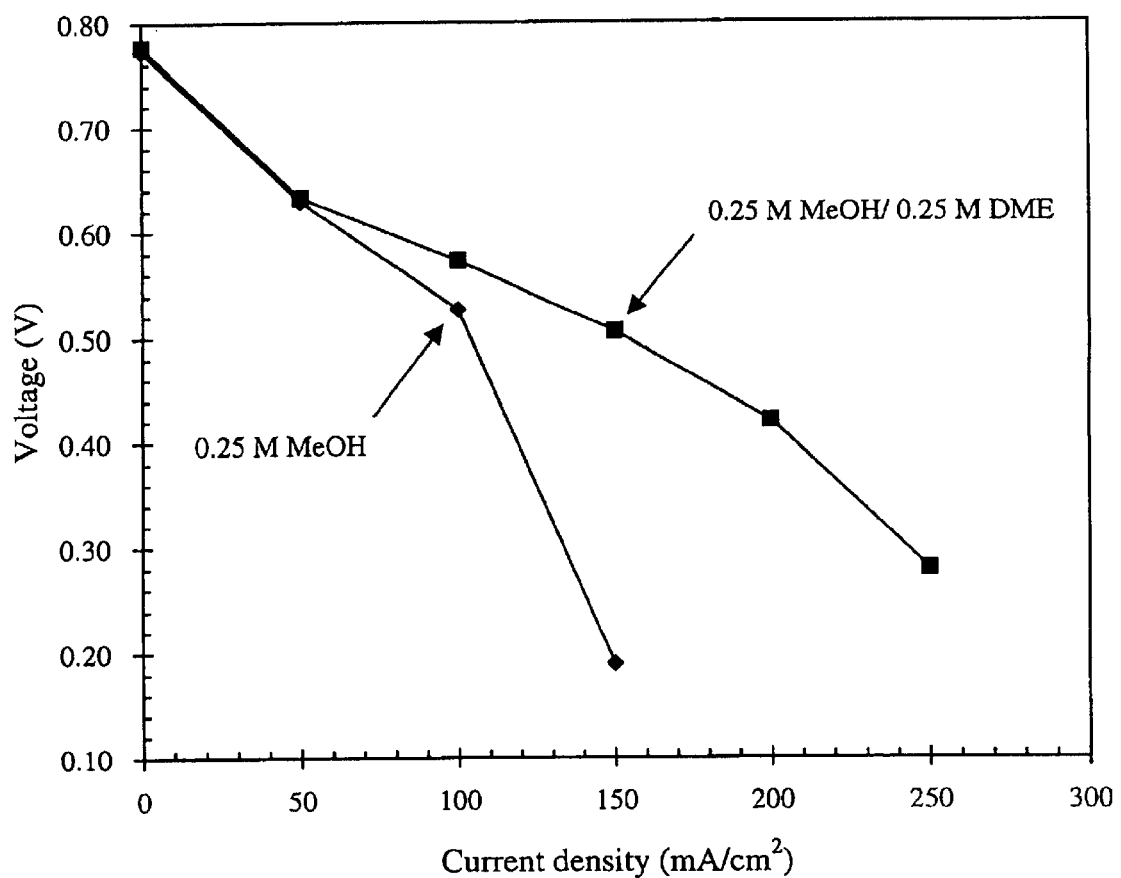
FIG. 7a compares the polarization curves for a fuel cell operating directly on an aqueous 0.25 M dimethyl ether/0.25 M methanol solution to one operating on an aqueous 0.25 M methanol solution.

FIG. 7a compares polarization curves for a direct methanol fuel cell operating on 0.25 M aqueous methanol solution and a direct methanol/DME fuel cell operating on a 0.25 M methanol/0.25 DME aqueous solution. The direct methanol/DME fuel cell compares favorably at low current density although the performance is somewhat poorer at higher current density.

Figure 7B:
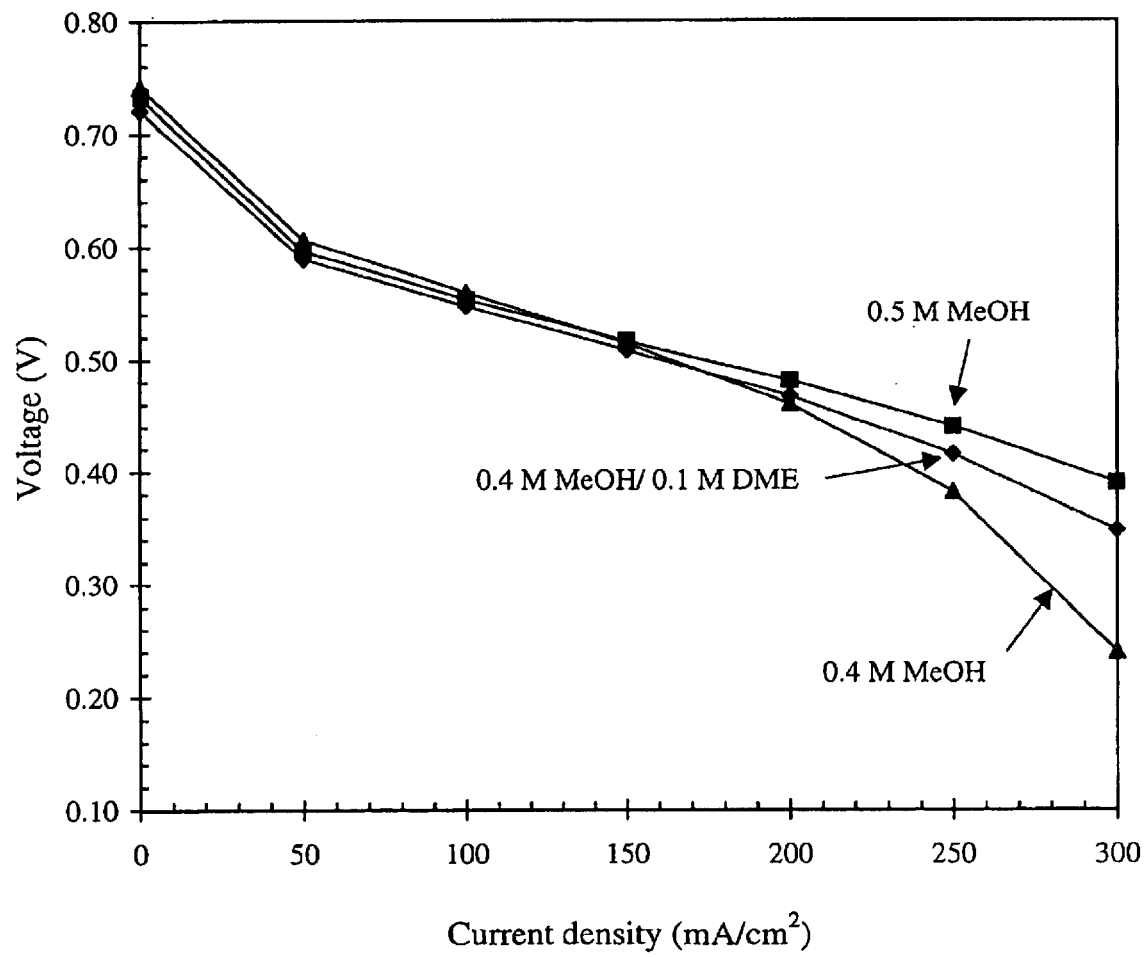
FIG. 7b compares the polarization curves for a fuel cell operating directly on an aqueous 0.1 M dimethyl ether/0.4 M methanol solution to fuel cells operating on aqueous 0.5 M methanol and 0.4 M methanol solutions.

FIG. 7b compares polarization curves for a fuel cell operating directly on a 0.4 M methanol/0.1 M DME in water solution to fuel cells operating on aqueous 0.5 M methanol and 0.4 M methanol solutions. Again, the direct methanol/DME fuel cell compares favorably to the direct methanol fuel cells. (Note that the reaction of a mole of DME involves twice the number of electrons as does a mole of methanol.)

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings.

What is claimed is:

1. A method of operating a fuel cell, said fuel cell comprising a cathode, an anode, and a solid polymer electrolyte, said method comprising supplying a fuel stream comprising dimethyl ether to said anode wherein dimethyl ether is directly oxidized at said anode.

2. The method of claim 1 wherein the operating temperature of said fuel cell is less than about 200° C.

3. The method of claim 2 wherein said fuel cell is a solid polymer fuel cell and said electrolyte comprises a proton exchange membrane.

4. The method of claim 3 wherein said fuel stream is a liquid.

5. The method of claim 4 wherein said liquid fuel stream additionally comprises water.

6. The method of claim 5 wherein said liquid fuel stream comprises greater than about 1.5 moles of dimethyl ether per liter of water.

7. The method of claim 5 wherein said liquid fuel stream comprises an additional fuel.

8. The method of claim 7 wherein said additional fuel is methanol.

9. The method of claim 8 wherein said liquid fuel stream comprises greater than about 0.1 mole of dimethyl ether per liter of water.

10. The method of claim 1 wherein said fuel stream is supplied to said anode at a pressure greater than about 4 bar absolute.

11. The method of claim 1 wherein said anode comprises a platinum ruthenium alloy catalyst.

12. The method of claim 1 wherein the oxidant stream supplied to said cathode at a pressure less than about 3 bar absolute.

13. The method of claim 1 wherein the stoichiometry of the oxidant stream supplied to said cathode is less than about 1.6.

14. The method of claim 1 wherein the fuel cell is operated at a current density of less than about 300 mA/cm$^2$.

15. The method of claim 1 comprising recirculating unreacted dimethyl ether from the anode exhaust of said fuel cell into said fuel stream.

16. The method of claim 1 comprising recirculating unreacted dimethyl ether from the cathode exhaust of said fuel cell into said fuel stream.

17. The method of claim 15 wherein the recirculating comprises separating unreacted dimethyl ether from the anode exhaust by pressure swing absorption, water absorption, or membrane separation.

18. The method of claim 16 wherein the recirculating comprises separating unreacted dimethyl ether from the cathode exhaust by pressure swing absorption, water absorption, or membrane separation.

19. The method of claim 1 comprising introducing dimethyl ether into said cathode before shut down whereby freezing of the cathode during shutdown is prevented.

20. The method of claim 1 comprising varying the composition of said fuel stream supplied to said anode during the operating of said fuel cell.

21. The method of claim 20 wherein the composition varies in accordance with a fuel cell operating parameter.

22. A fuel cell system comprising a fuel cell and a fuel stream supply comprising dimethyl ether, said fuel cell comprising a cathode, an anode, and a solid polymer electrolyte, wherein said anode is fluidly connected to directly oxidize dimethyl ether in said fuel stream supply comprising dimethyl ether.

23. The fuel cell system of claim 22 wherein said fuel cell is a solid polymer fuel cell and said electrolyte comprises a proton exchange membrane.

24. The fuel cell system of claim 23 wherein said fuel stream is a liquid stream and said fuel cell is a liquid feed solid polymer fuel cell.

25. The fuel cell system of claim 24 wherein said fuel stream comprises water.

26. The fuel cell system of claim 25 wherein said fuel stream comprises an additional fuel.

27. The fuel cell system of claim 26 wherein said additional fuel is methanol.

28. The fuel cell system of claim 25 wherein said system comprises:
   a mixing apparatus for providing said fuel stream for said fuel cell, said anode fluidly connected to a mixing apparatus outlet; and
   supplies of dimethyl ether and water fluidly connected to mixing apparatus inlets.

29. The fuel cell system of claim 27 wherein said system comprises:
   a mixing apparatus for providing said fuel stream for said fuel cell, said anode fluidly connected to a mixing apparatus outlet; and
   supplies of dimethyl ether, water, and methanol fluidly connected to mixing apparatus inlets.

30. The fuel cell system of claim 28 wherein said system comprises a recirculation loop fluidly connecting an electrode exhaust of said fuel cell to a mixing apparatus inlet.

31. The fuel cell system of claim 30 wherein said recirculation loop comprises a heat exchanger.

32. The fuel cell system of claim 30 wherein said recirculation loop comprises a pressure swing absorption, water absorption, or membrane separation apparatus.

33. The fuel cell system of claim 30 wherein said recirculation loop fluidly connects the cathode exhaust of said fuel cell to a mixing apparatus inlet.

34. The fuel cell system of claim 30 wherein said recirculation loop fluidly connects the anode exhaust of said fuel cell to a mixing apparatus inlet.

* * * * *